(12) United States Patent  
Hung

(10) Patent No.: US 6,310,371 B1  
(45) Date of Patent: Oct. 30, 2001

(54) FINGERPRINT SENSOR CHIP

(75) Inventor: Tz-Ian Hung, Hsin-Ying (TW)

(73) Assignee: United Microelectronics Corp., Hsin-chu (TW)

( * ) Notice: Subject to any disclaimer, the term of this patent is extended or adjusted under 35 U.S.C. 154(b) by 0 days.

(21) Appl. No.: 09/414,894

(22) Filed: Oct. 8, 1999

(51) Int. Cl.[7] ............ H01L 27/14; H01L 29/82; H01L 29/84
(52) U.S. Cl. ........... 257/252; 257/254; 257/414; 257/415; 438/48; 73/862.046; 382/124; 382/125
(58) Field of Search ............... 257/414, 415, 257/252, 254, 417, 418; 438/48; 73/862.046; 382/124, 125

(56) References Cited

U.S. PATENT DOCUMENTS

| | | | |
|---|---|---|---|
| 5,373,181 | * | 12/1994 | Scheiter et al. ............ 257/415 |
| 5,400,662 | * | 3/1995 | Tamori ............ 73/862.046 |
| 5,869,791 | * | 2/1999 | Young ............ 178/20.01 |
| 6,060,756 | * | 5/2000 | Machida et al. ............ 257/415 |
| 6,088,471 | * | 7/2000 | Setlak et al. ............ 382/124 |

FOREIGN PATENT DOCUMENTS

| 363221483 | * | 9/1988 | (JP) . |
|---|---|---|---|
| 2000356506 | * | 12/2000 | (JP) . |

* cited by examiner

*Primary Examiner*—William Mintel  
(74) *Attorney, Agent, or Firm*—Winston Hsu

(57) ABSTRACT

The present invention provides a fingerprint sensor chip formed on a dielectric layer of a semiconductor wafer. The fingerprint sensor chip comprises a plurality of rectangular sensor areas arranged in a matrix format which are surrounded by conductors, a second dielectric layer covering the sensor areas and the conductors wherein the surface of the second dielectric layer positioned above each of the sensor areas is formed as a protruding rectangular platform with a shallow trench around the platform, a rectangular metal plate positioned on top of each of the rectangular platforms which is used as a sensor plate of the fingerprint sensor chip, and a protective layer positioned on the surface of the semiconductor wafer to cover and protect the underlying circuitry.

8 Claims, 5 Drawing Sheets

FINGERPRINT SENSOR CHIP

BACKGROUND OF THE INVENTION

1. Field of the Invention

The present invention relates to a sensor chip, and more particularly, to a fingerprint sensor chip.

2. Description of the Prior Art

In semiconductor processing, a fingerprint sensor chip is a type of functional chip used as a biometric sensor, sequentially packaged with a fingerprint discriminator. The fingerprint sensor chip comprises approximately ninety thousand metal plates arranged as a 300×300 pixel matrix, these plates positioned between an inter-metal dielectric (IMD) layer and a protective layer. Each of the metal plates is used as a sensor plate of the fingerprint chip. When a user touches the protective layer, each of the sensor plates senses the static voltage from the surface contact of the user's finger. The voltages recorded by each sensor plate will vary with the undulating surface of the user's finger, and together they form a pattern of the fingerprint. This pattern can be passed on to image recognition circuits to provide recognition and discrimination of the fingerprint.

Please refer to FIG. 1 and FIG. 2. FIG. 1 is a schematic diagram of the layout of sensor areas 23 on a fingerprint sensor chip 13 according to the prior art. FIG. 2 is a cross-sectional schematic diagram along line 2—2 of the fingerprint sensor chip 13 shown in FIG. 1. The prior art fingerprint sensor chip 13 is formed on a dielectric layer 12 of a semiconductor wafer 10 on which a plurality of rectangular sensor areas 23 arranged in a matrix format are defined. The fingerprint sensor chip 13 comprises conductors 14 positioned on the dielectric layer 12 surrounding each of the sensor areas 23, an IMD layer 15 covering the dielectric layer 12 and the conductors 14, a plurality of metal plates 22 positioned on the IMD layer 15 above each sensor area 23, and a protective layer 24 covering the metal plates 22 and the IMD layer 15. The IMD layer 15 is a complex structure that comprises a spin on glass (SOG) layer 18 and a silicon oxide layer 20. The SOG layer 18 fills the space between each conductor 14 and smoothes the outer-most sides of each conductor 14. The silicon oxide layer 20 covers the dielectric layer 12, the conductors 14 and the SOG layer 18.

Each of the conductors 14 is used as an electrical connection to pattern recognition circuits or any other internal circuitry of the fingerprint sensor chip 13. Each of the metal plates 22 is used as a sensor plate of the fingerprint sensor chip 13. The protective layer 24 is used to protect the internal circuitry of the fingerprint sensor chip 13. When a user touches the protective layer 24, each of the metal plates 22 senses static voltages from the surface contact of the user's finger. Then, the voltage variations across all the metal plates 22 are combined to produce a pattern of the fingerprint.

However, the SOG layer 18 positioned on the outer-most walls of the two adjacent conductors 14 and the surface of the dielectric layer 12 form a groove, which makes the surface of the silicon oxide layer 20 uneven. Consequently, the surfaces of the metal plates 22 formed on the groove are lowered in their centers and raised at their edges. When the user touches the fingerprint sensor chip 13, the distances from the center of the metal plate 22 to the user's finger and those from the edges of the metal plate 22 to the user's finger are not the same. This difference will effect the sensitivity and accuracy of the metal plates 22.

Also, the surface of the protective layer 24 has protrusions and depressions, in relation to the raised edges of each metal plate 22. When the fingerprint sensor chip 13 undergoes a cleaning process with a high-pressure water column, such as is done after mounting on a printed circuit board (PCB), cracks can easily form in the sunken surface of the protective layer 24. These cracks will allow water to permeate into the electric conductors 14 and lead to short-circuiting. Furthermore, during the packaging of the fingerprint sensor chip 13, cracks in the protective layer 24 can cause it to more easily pull away from the surface of the chip, rendering the device inoperable.

SUMMARY OF THE INVENTION

It is therefore a primary objective of the present invention to provide a fingerprint sensor chip to solve the above-mentioned shortcomings.

In a preferred embodiment, the present invention provides a fingerprint sensor chip formed on a semiconductor wafer, the semiconductor wafer comprising a first dielectric layer, the fingerprint sensor chip comprising:

a plurality of rectangular sensor areas arranged in a matrix format on the semiconductor wafer, each of the sensor areas being surrounded by electric conductors;

a second dielectric layer covered on the sensor areas and the conductors, the surface of the second dielectric layer positioned above each of the sensor areas being formed as a protruding rectangular platform with a shallow trench surrounding the platform, the shallow trench being positioned above the conductors around the sensor area;

a rectangular metal plate positioned on the top end of each of the rectangular platforms which is used as a sensor plate of the fingerprint sensor chip; and a protective layer positioned on the surface of the semiconductor wafer for covering and protecting each of the metal plates and the second dielectric layer.

It is an advantage of the present invention that the fingerprint sensor chip provides an even finger contact surface and even rectangular sensor plates, which enhances the sensitivity and accuracy of the fingerprint sensor chip. Also, this design helps to avoid damage to the chip in subsequent packaging and cleaning processes.

This and other objectives of the present invention will no doubt become obvious to those of ordinary skill in the art after having read the following detailed description of the preferred embodiment which is illustrated in the various figures and drawings.

DETAILED DESCRIPTION OF THE PREFERRED EMBODIMENT

Figure 1:
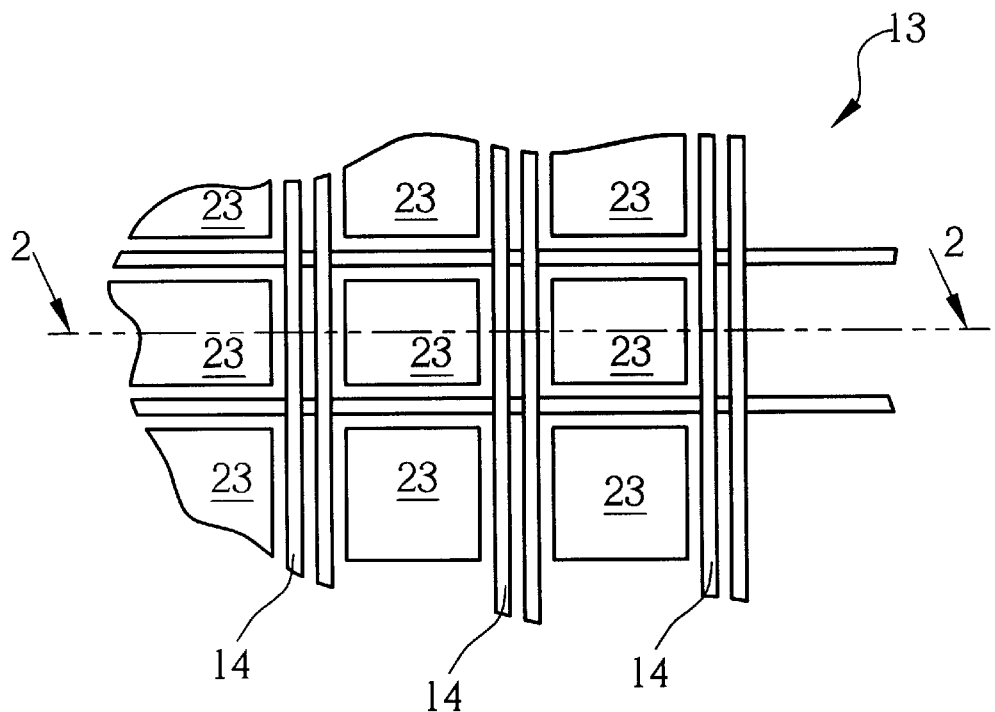
FIG. 1 is a schematic diagram of the layout of sensor areas on a fingerprint sensor chip according to the prior art.
Figure 2:
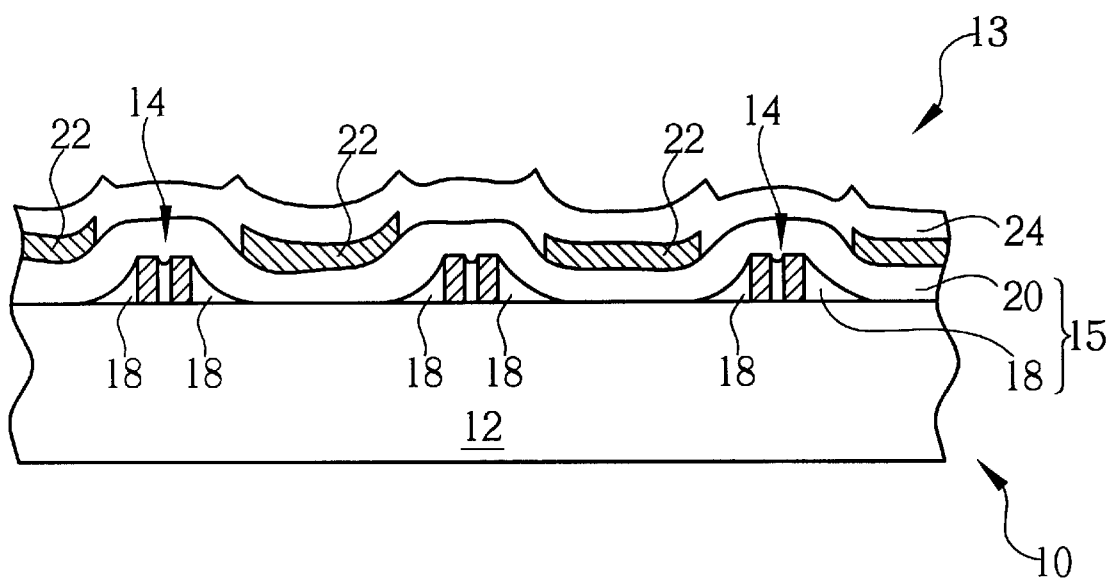
FIG. 2 is a cross-sectional schematic diagram along line 2—2 of the fingerprint sensor chip shown in FIG. 1.
Figure 3:
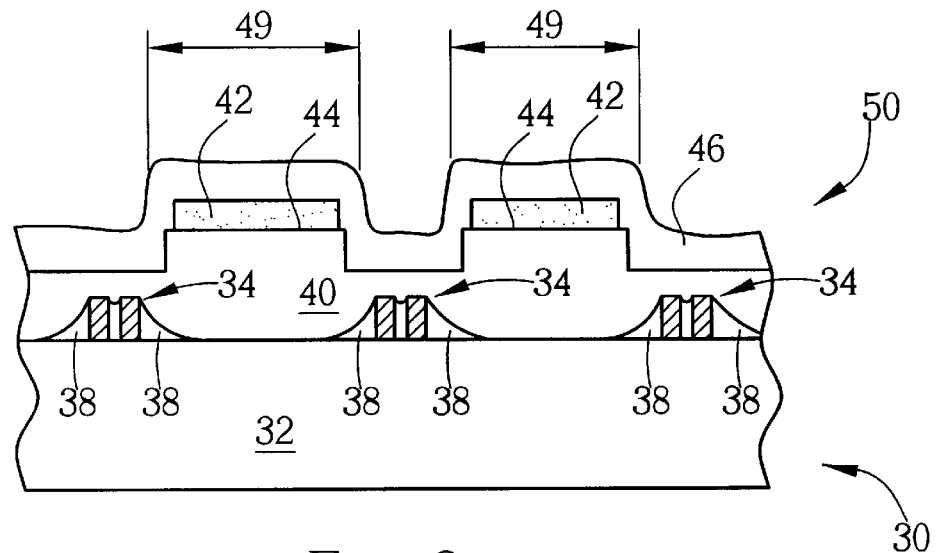
FIG. 3 is a cross-sectional schematic diagram of a fingerprint sensor chip according to the present invention.

Please refer to FIG. 3. FIG. 3 is a cross-sectional schematic diagram of a fingerprint sensor chip 50 according to the present invention. The present invention provides a fingerprint sensor chip 50 formed on a first dielectric layer 32 of a semiconductor wafer 30. The fingerprint sensor chip 50 comprises a plurality of regular sensor areas 49 arranged in a matrix format, at least one conductor 34, a plurality of spacers 38, a second dielectric layer 40, a plurality of rectangular metal plates 42 and a protective layer 46. Each of the conductors 34 surrounds each of the sensor areas 49, and is used as an interconnection line to image recognition circuits or any other internal circuitry of the fingerprint sensor chip 50. The second dielectric layer 40 covers the sensor areas 49 and the conductors 34 wherein the surface of the second dielectric layer 40 positioned above each of the sensor areas 49 is formed as a protruding rectangular platform 44. Each of the metal plates 42 is positioned on top of each platform 44 to be used as a sensor plate of the fingerprint sensor chip 50. The protective layer 46 is positioned on the semiconductor wafer 30 for covering and protecting each of the metal plates 42 and the second dielectric layer 40.

The spacers 38 are formed of spin on glass (SOG) and positioned on two sides of each conductor 34. The second dielectric layer 40 is made of silicon rich oxide (SRO), tetra-ethyl-ortho-silicate (TEOS, $Si(OC_2H_5)_4$) or spin on glass (SOG) wherein the SRO is used to prevent the conductors 34 from corroding due to the materials used during the subsequent manufacturing processes.

Figure 4:
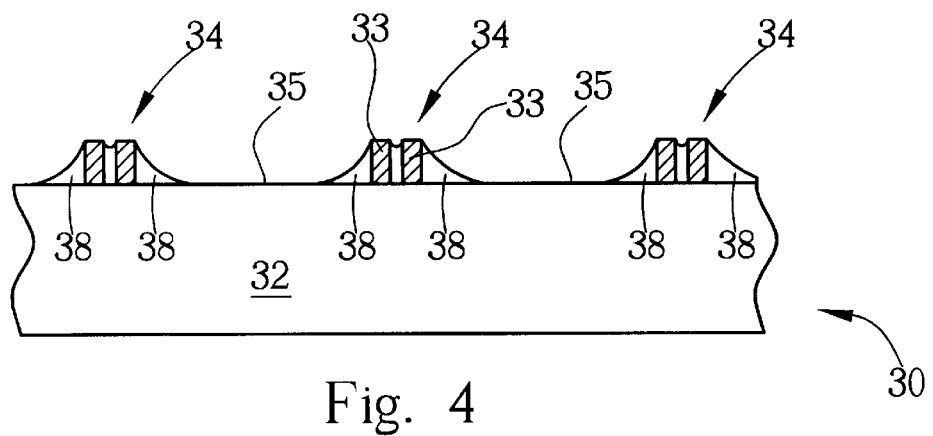
FIG. 4 to FIG. 8 are schematic diagrams of a method of forming the fingerprint sensor chip shown in FIG. 3.

Please refer to FIG. 4 to FIG. 8. FIG. 4 to FIG. 8 are schematic diagrams of a method of forming the fingerprint sensor chip 50 shown in FIG. 3. This method is performed on the first dielectric layer 32 of the semiconductor wafer 30. As shown in FIG. 4, an initial metal layer 33 is first formed on the dielectric layer 32 and then this metal layer 33 is defined as the conductors 34 by using photolithography and etching processes. The outer-most walls of two adjacent conductors 34 and the surface of the first dielectric layer 32 form a rectangular groove 35. A liquid solution comprising a silicate dissolved in alcohol or ketone, or siloxane with a functioning group, is spread onto the semiconductor wafer 30 by a spin method which is followed by a drying process to become an SOG layer. The SOG layer provides good filling ability and step coverage, so that the space inside each of the conductors 34 is completely filled. Afterwards, an anisotropic etching back process is performed to remove the SOG layer positioned above each of the conductors 34 and form the spacers 38 to smooth the corners of the rectangular groove 35.

Figure 5:
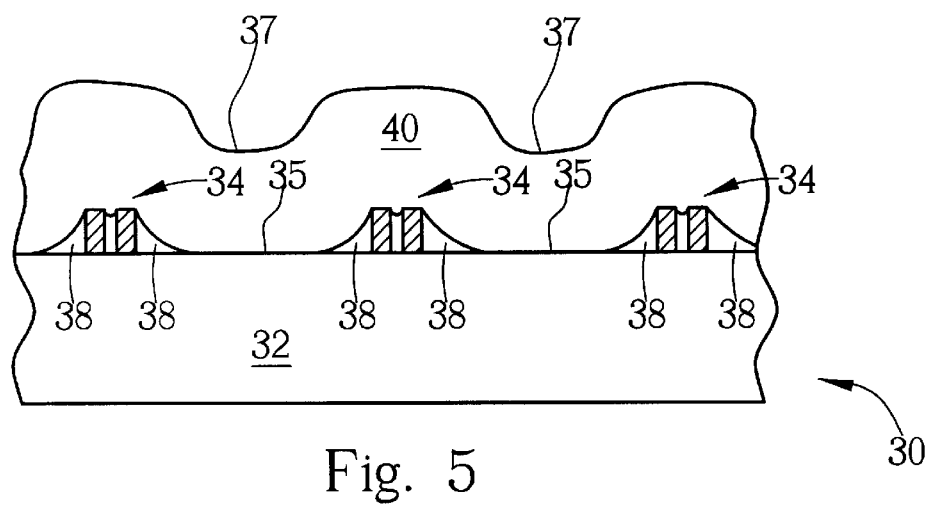

Next, as shown in FIG. 5, a plasma enhanced chemical vapor deposition (PECVD) process using TEOS as the reactant is performed to form the second dielectric layer 40 of a uniform thickness which covers each of the conductors 34 and spacers 38 and fills each of the rectangular grooves 35. The surface of the second dielectric layer 40 positioned on each of the rectangular grooves 35 forms a shallow trench 37, and the height of the surface of the second dielectric layer 40 positioned above each conductor 34 is higher than that positioned on each rectangular groove 35.

Figure 6:
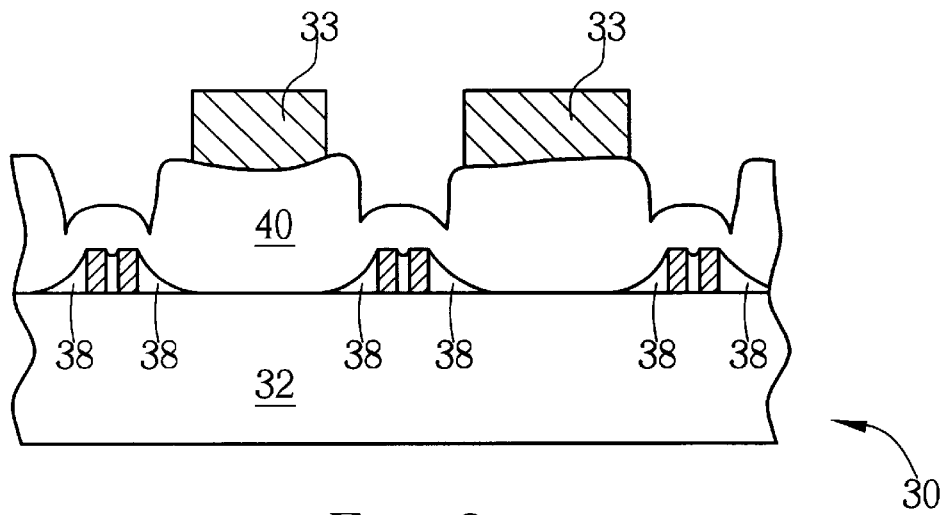

Then, as shown in FIG. 6, a lithographic process is performed to form a rectangular photoresist layer 33 on a predetermined area of the shallow trench. This mask is used to define the position of the sensor plate. Next, a dry-etching process is performed to vertically remove the second dielectric layer 40 not covered by the photoresist layer 33, making the height of the surface of the second dielectric layer 40 positioned above each conductor 34 lower than that positioned under each photoresist layer 33.

Figure 7:
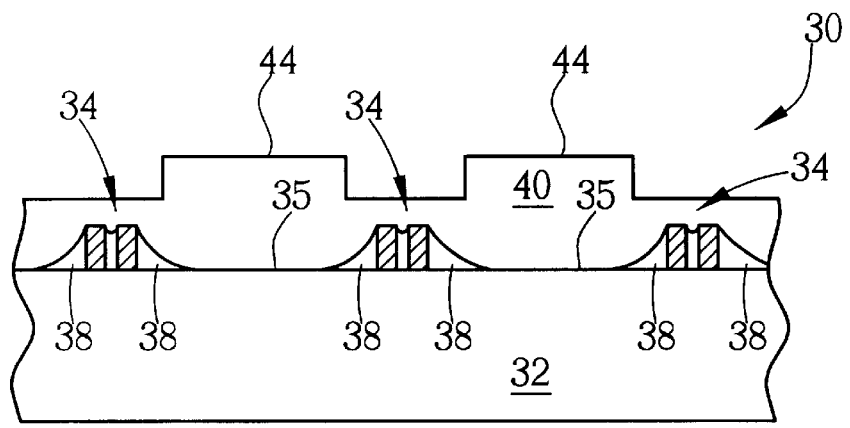

Next, as shown in FIG. 7, the photoresist layer 33 is removed and then a sacrificial layer (not shown) made of SOG is formed on the second dielectric layer 40 by a spin-coating method to approximately level the etched surface of the second dielectric layer 40. An etching back process with an etching selection ratio of the second dielectric layer 40 to the sacrificial layer of about 0.9~1.2 is performed to level off the surface of the second dielectric layer 40. The surface of the second dielectric layer 40 positioned on each of the rectangular grooves 35 becomes the protruding rectangular platform 44 and the height of the surface of each platform 44 is higher than that of the second dielectric layer 40 positioned on each conductor 34.

Figure 8:
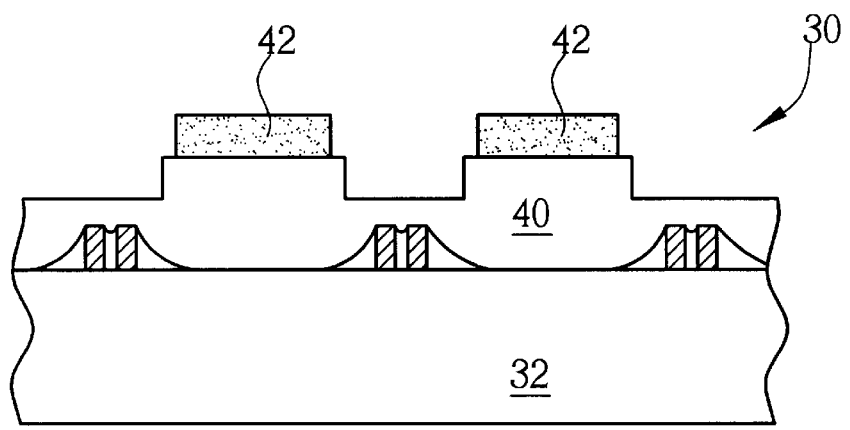

Next, as shown in FIG. 8, the plurality of rectangular metal plates 42 of uniform thickness are formed on each of the platforms 44 by using photolithography and etching processes. Finally, the protective layer 46 made of silicon nitride of a uniform thickness is formed on the semiconductor wafer 30 so as to complete the fingerprint sensor chip 50 shown in FIG. 3.

The spacers 38 positioned on two sides of each conductor 34 are used to smooth the surface of the semiconductor wafer 30. Consequently, the surface of the second dielectric layer 40 positioned on each rectangular groove 35 can be etched into the rectangular platforms 44, and thus each metal plate 42 can be evenly positioned on each platform 44. Furthermore, the protective layer 46 then formed on the semiconductor wafer 30 has a smoother surface.

As a user's finger presses onto the fingerprint sensor chip 50, the distance from a metal plate 42 to the surface of the finger is almost identical across the plate. This enhances the sensitivity and accuracy of the metal plate 42 and, furthermore, the smoothness of the protective layer 46 prevents the fingerprint sensor chip 50 from being damaged during any subsequent cleaning processes. Moreover, the height of the surface of each platform 44 is higher than that of the second dielectric layer 40 positioned above each conductor 34, which electrically isolates each metal plate 42 from its associated conductor 34.

Figure 9:
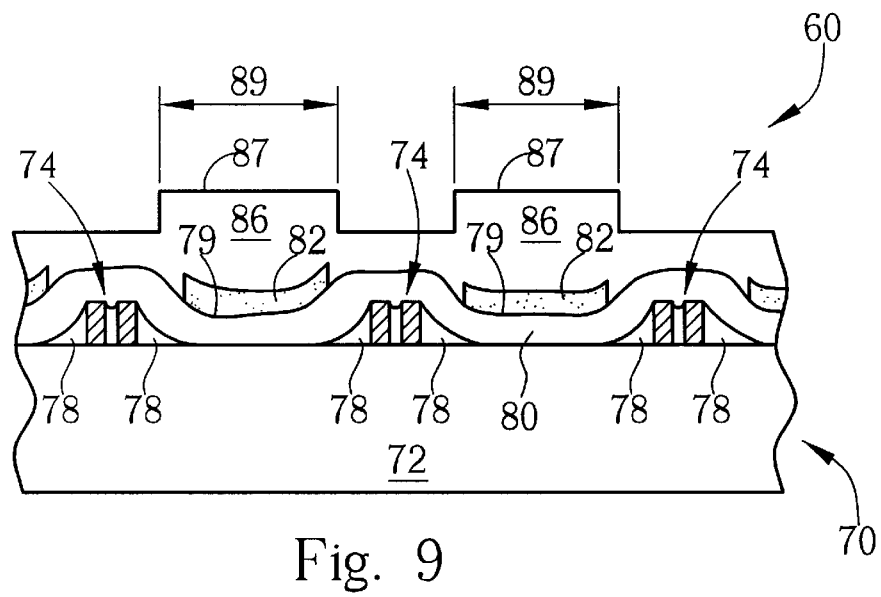
FIG. 9 is a cross-sectional schematic diagram of another fingerprint sensor chip according to the present invention.

Please refer to FIG. 9. FIG. 9 is a cross-sectional schematic diagram of another fingerprint sensor chip 60 according to the present invention. The fingerprint sensor chip 60 of the present invention is formed on a first dielectric layer 72 of a semiconductor wafer 70. The fingerprint sensor chip 60 comprises a plurality of rectangular sensor areas 89 arranged in a matrix format, a plurality of conductors 74, a plurality of spacers 78, a second dielectric layer 80, a plurality of metal plates 82, and a third dielectric layer 86. Each of the conductors 74 surrounds each of the sensor areas 89. Each of the spacers 78 is positioned on one side of each conductor 74. The second dielectric layer 80 is evenly positioned on the sensor areas 89 and conductors 74 wherein the surface of the second dielectric layer 80 positioned on each sensor area 89 forms a concave recess 79. Each of the metal plates 82 is respectively positioned in each of the concave recesses 79 to be used as a sensor plate of the fingerprint sensor chip 60. The third dielectric layer 86 covers the second dielectric layer 80 and the metal plates 82 to protect the fingerprint sensor chip 60. The surface of the third dielectric layer 86 positioned on each sensor area 89 is formed as a protruding rectangular platform 87.

Figure 10:
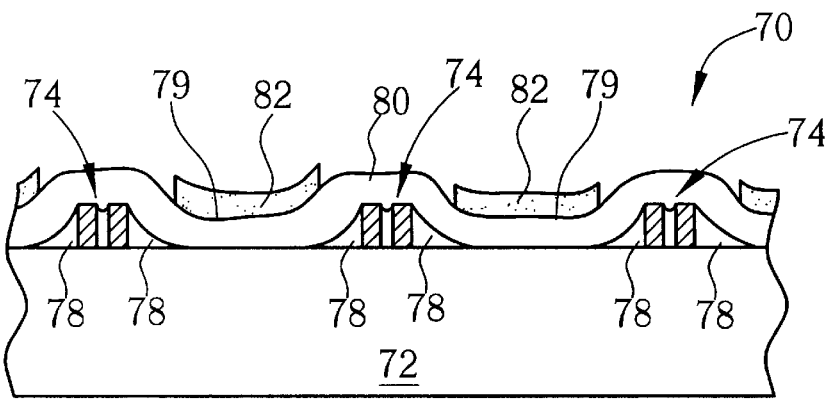
FIG. 10 to FIG. 12 are schematic diagrams of a method of forming the fingerprint sensor chip shown in FIG. 9.
Figure 11:
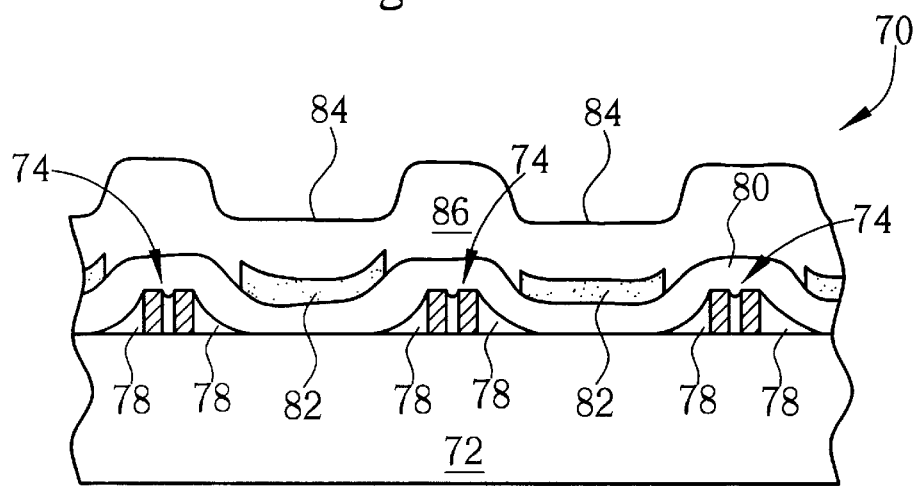
Figure 12:
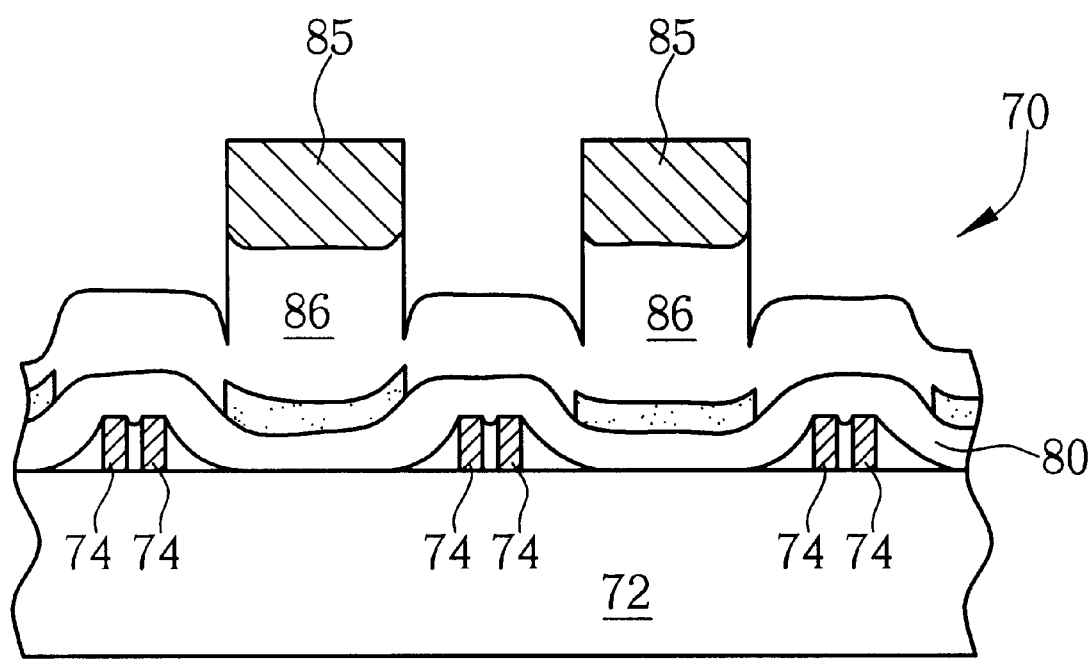

Please refer to FIG. 10 to FIG. 12. FIG. 10 to FIG. 12 are schematic diagrams of a method of forming the fingerprint sensor chip 60 shown in FIG. 9. The method of forming the fingerprint sensor chip 60 initially proceeds according to the above-mentioned method to form on the first dielectric layer 72 the conductors 74, the spacers 78, the second dielectric layer 80 and the concave recesses 79. Then, as shown in FIG. 10, a plurality of rectangular metal plates 82 of a uniform thickness arranged in a matrix format are formed on each of the concave recesses 79 by using deposition, photolithography and etching processes.

Next, as shown in FIG. 11, the third dielectric layer 86 of uniform thickness is formed on the semiconductor wafer 70 to cover the second dielectric layer 80 and each of the metal plates 82. The surface of the third dielectric layer 86 positioned above each metal plate 82 forms the shallow trench 84.

Then, as shown in FIG. 12, a lithographic process is performed to form a photoresist layer 85 of a specific shape on each of the shallow trenches 84 to be used as a mask. Afterwards, a dry etching process is performed to vertically remove the third dielectric layer 86 not covered by the photoresist layer 85, which makes the height of the surface of the third dielectric layer 86 positioned on each conductor 74 lower than that positioned on each metal plate 82.

After the photoresist layer 85 is completely removed, a sacrificial layer (not shown) made of SOG is formed on the third dielectric layer 86. Finally, an etching back process is performed to etch the surface of the third dielectric layer 86 to a plurality of protruding rectangular platforms 87 wherein the height of the surface of each platform 87 is higher than that of the third dielectric layer 86 positioned above each conductor 74. The fingerprint sensor chip 60 shown in FIG. 9 is then completed.

The platforms 87 are formed by using lithographic and etching processes on the third dielectric layer 86. The third dielectric layer 86 then comprises an even surface above each of the metal plates 82, which helps to protect the fingerprint sensor chip 60 and prevents damage during the cleaning process when the chip is subsequently mounted on a PCB.

Compared to the prior art of the fingerprint sensor chip 13, the present invention of the fingerprint sensor chip 50, 60 provides an even surface and rectangular sensor plates which enhances the sensitivity and accuracy of the fingerprint sensor chip. This also prevents the fingerprint sensor chip 50, 60 from being damaged during the subsequent cleaning process of packaging and PCB mounting.

Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A fingerprint sensor chip formed on a semiconductor wafer, the semiconductor wafer comprising a first dielectric layer, the fingerprint sensor chip comprising:
    a plurality of rectangular sensor areas arranged in a matrix format on the semiconductor wafer, each of the sensor areas being surrounded by electric conductors;
    a second dielectric layer covered on the sensor areas and the conductors, the surface of the second dielectric layer positioned above each of the sensor areas being formed as a protruding rectangular platform with a shallow trench surrounding the platform, the shallow trench being positioned above the conductors around the sensor area;
    a rectangular metal plate positioned on the top end of each of the rectangular platforms which is used as a sensor plate of the fingerprint sensor chip; and
    a protective layer positioned on the surface of the semiconductor wafer for covering and protecting each of the metal plates and the second dielectric layer.

2. The fingerprint sensor chip of claim 1 further comprising a spacer formed by spin on glass (SOG) and positioned at one side of each of the conductors.

3. The fingerprint sensor chip of claim 1 wherein the second dielectric layer is made by silicon rich oxide (SRO), tetra-ethyl-ortho-silicate (TEOS, $S_t(OC_2H_5)_4$) or spin on glass (SOG).

4. The fingerprint sensor chip of claim 3 wherein the SRO is formed by using a chemical vapor deposition (CVD) process for preventing the conductors from erosion by the materials produced during the manufacturing process of the chip.

5. The fingerprint sensor chip of claim 3 wherein the TEOS is formed by using a plasma enhanced chemical vapor deposition (PECVD) process.

6. A fingerprint sensor chip formed on a semiconductor wafer, the semiconductor wafer comprising a first dielectric layer, the fingerprint sensor chip comprising:
    a plurality of rectangular sensor areas arranged in a matrix format on the semiconductor wafer, each of the sensor areas being surrounded by electric conductors;
    a second dielectric layer uniformly covered on the sensor areas and conductors, the surface of the second dielectric layer above each of the sensor areas being formed as a concave recess;
    a rectangular metal plate positioned inside each of the recesses and positioned above the sensor area under the recess which is used as a sensor plate of the fingerprint sensor chip; and
    a third dielectric layer covered on the second dielectric layer and the metal plates for protecting the fingerprint sensor chip, the surface of the third dielectric layer positioned above each of the sensor areas being formed as a protruding rectangular platform with a shallow trench surrounding the platform, the shallow trench being positioned above the conductors around the sensor area.

7. The fingerprint sensor chip of claim 6 further comprising a spacer formed by spin on glass (SOG) and positioned at one side of each of the conductors.

8. The fingerprint sensor chip of claim 6 wherein the second dielectric layer is formed by silicon oxide which is created by performing a plasma enhanced chemical vapor deposition (PECVD) process employing TEOS as the reactant.

* * * * *